US010614253B2

(12) United States Patent
Vieyra

(10) Patent No.: US 10,614,253 B2
(45) Date of Patent: Apr. 7, 2020

(54) SYSTEMS AND METHODS FOR STATE OF DATA MANAGEMENT

(71) Applicant: Fortune Vieyra, Houston, TX (US)

(72) Inventor: Fortune Vieyra, Houston, TX (US)

( * ) Notice: Subject to any disclaimer, the term of this patent is extended or adjusted under 35 U.S.C. 154(b) by 227 days.

(21) Appl. No.: 15/896,963

(22) Filed: Feb. 14, 2018

(65) Prior Publication Data

US 2019/0251295 A1 Aug. 15, 2019

(51) Int. Cl.
| | |
|---|---|
| *H04L 29/06* | (2006.01) |
| *G06F 21/64* | (2013.01) |
| *H04L 9/06* | (2006.01) |
| *G06F 3/06* | (2006.01) |
| *G06F 21/62* | (2013.01) |
| *H04L 9/30* | (2006.01) |
| *H04L 9/32* | (2006.01) |

(52) U.S. Cl.
CPC ............ *G06F 21/64* (2013.01); *G06F 3/0649* (2013.01); *G06F 21/6218* (2013.01); *H04L 9/0643* (2013.01); *H04L 9/30* (2013.01); *H04L 9/3239* (2013.01); *H04L 2209/38* (2013.01)

(58) Field of Classification Search
CPC .... H04L 2209/38; H04L 9/3239; G06F 21/64
See application file for complete search history.

(56) References Cited

U.S. PATENT DOCUMENTS

| | | | |
|---|---|---|---|
| 6,076,077 A | 6/2000 | Saito | |
| 6,973,556 B2 | 12/2005 | Milligan et al. | |
| 7,203,711 B2 | 4/2007 | Borden et al. | |
| 7,454,443 B2 | 11/2008 | Ram et al. | |
| 7,533,181 B2 | 5/2009 | Dawson et al. | |
| 7,613,572 B2 | 11/2009 | Prahlad et al. | |
| 7,657,581 B2 | 2/2010 | Orenstein et al. | |
| 7,748,031 B2 | 6/2010 | Gonzalez et al. | |
| 9,635,000 B1* | 4/2017 | Muftic | H04L 63/0435 |
| 9,667,427 B2 | 5/2017 | Oberhauser et al. | |
| 9,722,790 B2 | 8/2017 | Ebrahimi | |
| 9,774,578 B1 | 9/2017 | Ateniese et al. | |
| 9,855,785 B1 | 1/2018 | Nagelberg et al. | |
| 9,858,781 B1 | 1/2018 | Campero et al. | |
| 2016/0261411 A1 | 9/2016 | Yau et al. | |
| 2016/0292396 A1 | 10/2016 | Akerwall | |
| 2016/0300234 A1 | 10/2016 | Moss-Pultz et al. | |
| 2016/0321654 A1 | 11/2016 | Lesavich et al. | |
| 2017/0046652 A1 | 2/2017 | Haldenby et al. | |
| 2017/0091397 A1 | 3/2017 | Shah | |
| 2017/0111175 A1 | 4/2017 | Oberhauser et al. | |
| 2017/0126702 A1* | 5/2017 | Krishnamurthy | H04L 63/123 |
| 2017/0132621 A1 | 5/2017 | Miller et al. | |
| 2017/0163733 A1* | 6/2017 | Grefen | H04L 9/3236 |
| 2017/0337534 A1 | 11/2017 | Goeringer et al. | |
| 2017/0366353 A1 | 12/2017 | Struttmann | |
| 2018/0374173 A1* | 12/2018 | Chen | G06F 21/10 |
| 2019/0034465 A1* | 1/2019 | Shimamura | H04L 9/3239 |
| 2019/0123889 A1* | 4/2019 | Schmidt-Karaca | H04L 9/3236 |

* cited by examiner

*Primary Examiner* — Dao Q Ho

(74) *Attorney, Agent, or Firm* — Volpe and Koenig, P.C.

(57) ABSTRACT

A system and method for facilitating a blockchain-based state of data management that includes: receiving the state of data, the state including a data identifier associated with a blockchain network, a resource identifier, and one of: a public key and a state identifier; generating a state identifier using a least the public key included in the received state of data and one or more hashing algorithms.

16 Claims, 8 Drawing Sheets

SYSTEMS AND METHODS FOR STATE OF DATA MANAGEMENT

CROSS-REFERENCE TO RELATED APPLICATIONS

Not applicable.

STATEMENT REGARDING FEDERALLY SPONSORED RESEARCH

Not applicable.

BACKGROUND

The present invention generally relates to a blockchain-based management of the state of data, specifically the use of a state meta data and networks to securely store and convey state details for applications and systems for use thereof in execution of blockchain-based state of data management before, during and after data changes or is transmitted in applications and systems.

In many software applications and systems, data can be created, read, updated, divided, merged, deleted and transferred quickly and repeatedly over the lifespan of a session. A session describes a duration of time at which data is represented. When changes to data take place, the state of the data changes. The state represents the point at which data exist before, during or after data has changed. Therefore, a change in data subsequently changes the state of the data at a given session. Applications produce, transform, remove and transmit data internally and/or to other applications and systems (e.g., a mobile application may generate and send usage statistics to a remote analytics service). When an application produces data over time, the state of the data provides a way for systems to measure changes to data. While there are systems that manage the state of data, these systems generally maintain the state of data independently, which may lead to a possible manipulation of the state of data or manipulation of the system that manages the state of data. Therefore, a need exists for the state of data to be managed by a decentralized system that may contain one or more managers of the state of data.

When data is created, there exists a session at which the data exist in memory. The data may change several times during a data creation session at which every change in the data constitutes a state change. A change in data while data is created is said to be referred to as a data creation lifecycle. During a data creation lifecycle, data may undertake several revisions at which the final revision sets the data to a final state. Data created by individuals are said to reach a final state that may be verifiable. Contrarily, data created by applications and systems may not be verifiable since some applications and systems can be corrupted, infiltrated, transformed, mutated and otherwise compromised. Therefore, a need exists to authenticate data during creation time, when data reaches a final state in applications and systems.

Very often, systems incorporate some level of data encryption (e.g. using a md5 hash or a sha256 hash function to produce hash values) to encrypt data prior to transmission which may include using public and private keys. In some instances, the encrypted data may be altered during transmission or the public or private key could be compromised by malware. Thus, there exists a need to ensure that data is authenticated during a data transfer lifecycle, irrespective of the method of encryption before or during the time data is transferred by using a blockchain network where each of the state metadata or hash values can be stored and used to verify changes to data over time.

A blockchain is a way to authenticate records which are linked and secured using cryptography. Blockchains are inherently resistant to modifications of the data when distributed across multiple blockchain computing systems in a network ("blockchain network"). A blockchain-based state of data management in applications and systems provides a way to authenticate the state of data.

The present invention is distinguished from the following patents:

The present invention is distinguished from U.S. Pat. No. 7,748,031—Mass Storage Device with Automated Credentials. The present invention, in some embodiments, addresses the blockchain-based state of data management and is not related to a mass storage device that uses two factor authentications.

The present invention is distinguished from U.S. Pat. No. 9,635,000—Blockchain Identity Management System Based on Public Identities Ledger. The present invention use of a public identity ledger is replaced with a ledger that manages state metadata and hash values. The present invention is not designed for validating identities of members in a community, but instead is validating the authenticity of data over time and also to invalidate data that may be manipulated by an unwanted intruder.

The present invention is distinguished from U.S. Pat. No. 9,667,427—Systems and Methods for Managing Digital Identities. The present invention is not designed to manage digital identities of users, but instead to validate or invalidate data over time. The present invention is also agnostic to the type of data that may come from a source device and is primarily focused on authenticating the state of data (the state of data could contain a hash value representing the data, timestamp, source id etc. and/or metadata).

The present invention is distinguished from U.S. Pat. No. 9,722,790—Identity Management Service Using a Blockchain Providing Certifying Transactions Between Devices. The present invention uses the concepts of a distributed public database, but is agnostic to the type of data that may come from a source device, and is primarily focused on validating or invalidating data over time. In the present invention, authenticating the state of data while it is created, updated and transferred ensures that the data received by a source device is the correct (unaltered) data.

The present invention is distinguished from U.S. Pat. No. 9,774,578—Distributed Key Secret for Rewritable Blockchain. The present invention is primarily focused on a system that uses a blockchain, not the inner workings of the blockchain.

The present invention is distinguished from U.S. Pat. No. 9,855,785—Digitally Encoded Seal for Document Verification. The present invention uses some of the concepts of a digitally encoded seal, but does not make use of a seal, as verification of the changes to data is done by a state manager that uses a blockchain network. The present invention does not make use of scanning a document (digital/physical) as the verification is based on the state of any type of data and not the inner contents of the document.

The present invention is distinguished from U.S. Pat. No. 9,858,781—Architecture for Access Management. The present invention is not related access management but instead focuses on managing the state of data that systems (such as a security or analytics system) may use to authenticate changes to data over time. In several embodiments, the present invention sits on top of the architecture for access management and other related verification systems and acts as a base system for authenticating changes to data over time.

The present invention is distinguished from US20160261411A1—Method and System of Providing Authentication of User Access to A Computer Resource via a Mobile Device Using Multiple Separate Security Factors. The present invention is not related to access management but instead focuses on managing the state of data that systems (such as a security system) may use to authenticate changes to data over time. The present invention also makes use of a blockchain network to keep a ledger of all the hash values or state meta related to data at each state change.

The present invention is distinguished from US20160292396A1—System and Method for Authenticating Digital Content. The present invention focuses on state management of any type of data (not just user generated data). The present invention also permeates authentication at various points in the lifecycle of the data (e.g. when data is created, updated, removed, transferred). The present invention, in several embodiments, is also an improvement that supports verifying multiple points of interaction from devices and elements in the verification lifecycle (e.g. verifying, data, meta data, hash data, transport data, source data, target data etc.) which creates a completely secure and authenticated verification of data over time across all devices and elements that are involved in the verification lifecycle.

The present invention is distinguished from U.S. Pat. No. 6,076,077—Data Management System. The present invention may exist outside of the context of a database system (e.g. may be in virtual memory). The database system may not contain the edited content in the present invention. Encryption and decryption in the present invention may be done with parts of the data (e.g. packets of data) or may exist prior to or during data transport.

The present invention is distinguished from U.S. Pat. No. 6,973,556—Data Element Including Metadata that includes data management information for managing the data element. In the present invention, the metadata and hash values of the data element and metadata are stored in a distributed system (e.g. a blockchain network). In the present invention, recovery of data elements is enhanced with the use of a distributed system that stores a hash value of the data and/or metadata in MINE (e.g. hash values stored in blockchain network). In the present invention, the use of a redundant array of independent disks (RAID) is replaced with a distributed system and one or more system that manages the state of data.

The present invention is distinguished from U.S. Pat. No. 7,203,711—System and Method for Distributed Content Storage and Management. The present invention does not include indexed archived systems as the content (e.g. data or metadata) and is not indexed, but is instead a reference to data or metadata that is stored in a distributed system (e.g. a blockchain network). The notion of a "file" is not present in the present invention as the content could be of varying types (e.g. data, packets, bytes etc.) The process of "extracting metadata for file" is not present in the present invention, as the metadata is generated using a combination of identifiers (e.g. source id, date, time, target id, etc.).

The present invention is distinguished from U.S. Pat. No. 7,454,443—Method, System and Program for Personal Data Management Using Content-Based Replication. The present invention may exist outside of the context of hard disk, mobile or stationary computer as the replication of hash values are stored over more than one node in a blockchain network. The use of a "fingerprint engine" is not present in the present invention as the use of a fingerprint is replaced with a hash value that is stored on a blockchain network.

The present invention is distinguished from U.S. Pat. No. 7,533,181—Apparatus, System and Methods for Data Access Management. The present invention only relates to the verification and authentication of data and not the storage of data or the management of data access.

The present invention is distinguished from U.S. Pat. No. 7,613,752—System and Methods for Using Metadata to Enhance Data Management Operations. The present invention is not related to the use of a "Metabase" that stores metadata in a central database, because in the present invention the metadata or hash values from metadata is distributed in a blockchain network of nodes.

The present invention is distinguished from U.S. Pat. No. 7,657,581—Metadata Management for Fixed Content Distributed Data Storage. The present invention is not related to the use of a "Backup copies" and instead represents copies of metadata across a blockchain network.

The present invention is distinguished from US20160300234A1—System and Method for Decentralized Title Recordation and Authentication. The present invention is not related to title recordation from one party to another, but instead focuses on managing the state of data over times by using a blockchain network.

The present invention is distinguished from US20160321654A1—Method and System for Storage and Retrieval of Blockchain Blocks Using Galois Fields. The present invention is primarily focused on a system that uses a blockchain, not the inner workings of the blockchain.

The present invention is distinguished from US20160321654A1—System and Method for Tracking Behavior of Networked Devices using Hybrid Public-Private Blockchain Ledgers. The present invention is primarily focused on the state of data management using a blockchain network and not specifically the tracking of assets between networked devices.

The present invention is distinguished from US20170091397A1—Device-Driven Non-Intermediated Blockchain System Over A Social Integrity Network. The present invention is primarily focused on the state of data management using a blockchain network and not specifically the processing of components over a communications network.

The present invention is distinguished from US20170111175A1—Systems and Method for Managing Digital Identities. The present invention uses the concepts of a distributed ledger system to validate or invalidate data over time. The present invention is agnostic to the type of data that may come from a source device and is primarily focused on authenticating the state of data and not the data itself (the state of data could contain a hash value representing the data, timestamp, source id etc.)

The present invention is distinguished from US20170126702A1—Verification Lineage Tracking and Transfer Control of Data Sets. The present invention is a major improvement that focuses on state of data management and not primarily the management of data (the state of data may be a digital signature "hash values" or a state meta data). The present invention is a major improvement that focuses on state management of any type of data (not just a copy of data that needs to be verified). The present invention is a major improvement that also permeates authentication at various points in the lifecycle of the data (e.g. when data is created, updated, removed, transferred). The present invention is a major improvement that supports verifying the transport of data and the data being transported (e.g. includes data, data meta, transport, transport meta). The present invention is a major improvement that supports verifying multiple points of interaction from devices and elements in the verification lifecycle (e.g. verifying, data, meta data, hash data, transport data, source data, target data etc. which creates a completely secure and authenticated verification across all devices and elements that are involved in the verification lifecycle). The present invention is a major improvement that supports verifying data, state meta and hash values from more than one source device (e.g. three applications send data to be verified, the data, meta and/or hash is sent to a blockchain network, a target device requests for verification of three applications and holds the verification for processing. Thus, a batch processing takes place on a target device that verifies three applications).

The present invention is distinguished from US20170132621A1—System and Method for Autonomous Device Transactions. The present invention is primarily focused on the state of data management using a blockchain network and not the inner workings of a blockchain network.

The present invention is distinguished from US20170163733A1—System and Method for Data Management Structure using Auditable Delta Records in a Distributed Environment. The present invention is not related to auditable delta records but instead focuses on managing the state of data over times by using a blockchain network.

The present invention is distinguished from US20170337534A1—Systems and Methods for Blockchain Virtualization and Scalability. The present invention is primarily focused on a system that uses a blockchain, not the inner workings of the blockchain.

The present invention is distinguished from US20170366353A1—Generation of Hash Values Within a Blockchain. The present invention is primarily focused on a system that uses a blockchain, not the inner workings of the blockchain.

SUMMARY

In several embodiments, the present invention relates to systems and methods for blockchain-based state of data management where the state of data is managed by a data manager that uses a blockchain network to store changes to data. The state of data may be encrypted or hashed by one or more hash functions (e.g. a "md5" or "sha256" hash function) and may be saved and retrieved in parts (e.g. state of data may be fragmented) or grouped with other states of data (e.g. a group of all changes in one or more components in an application).

Applications produce, transform, remove and transmit data to other applications and systems. In many software applications and systems, data can be created, read, updated, deleted and transferred quickly and repeatedly over the life span of a session. A "session" describes a duration of time at which data of varying types (e.g. analytics data, user data, etc.) are represented. When changes to data take place, the state of the data changes. The "state" represents the point at which data exists before, during or after data has changed. Therefore, a change in data subsequently changes the state of the data at a given duration of time.

When data is created, there exists a session at which the data exists in memory. The data may change several times during a data creation session. A change in data while data is created is said to be referred to as a "data creation lifecycle". During a data creation lifecycle, data may undertake several revisions in which the final revision sets the data to a final state. Data created by individuals is said to reach a final state that may be verifiable. Contrarily, data created by applications and systems may not be verifiable (e.g. an application may not validate that data stored in an external memory is consistent with data stored in the application memory) since applications and systems can be corrupted, infiltrated, transformed, mutated and otherwise compromised. There exists a need to authenticate data during creation time, when data reaches a final state in applications and systems to ensure consistency and reliability of applications and systems over time.

In one embodiment of the present invention, the present invention is a method for facilitating a "blockchain"-based state of data management that includes: receiving, by a receiving device, the state of data, wherein the state of data includes at least a data identifier associated with a blockchain network, a resource identifier, and one of: a public key and a state identifier; generating, by a processing device, a state identifier using at least the public key included in the received state of data and one or more hashing and/or encoding algorithms, if the received state of data does not include a state identifier; generating, by the processing device, a state meta data, wherein the meta data includes a first data element configured to store properties of the data and (i) the data identifier or an encoded value based on the data identifier, (ii) the state identifier, (iii) a resource identifier, (iv) and data lifecycle type; transmitting the state meta data to a blockchain network and target device from a source device by way of the method of blockchain-based state of data management.

In one embodiment of the present invention, the present invention is a system for facilitating a blockchain-based state of data management, comprising: a receiving device configured to receive state meta data, wherein the state meta data includes at least a data identifier associated with a blockchain network, a resource identifier, and one of: a public key and a state identifier, a processing device configured to generate a state identifier using a least the public key included in the received state of data, and one or more hashing algorithms if the receiving state of data does not include a state identifier generating a state meta data, wherein the state meta data is formatted based on one or more standards and includes a plurality of data elements, including at least a first data element configured to store properties of the data and a second data element reserved for private use, and the first data element includes at least (i) the type of data, (ii) the length of data, (iii) the origin of data, (iv) the date and time; the second data element includes at least (i) the data identifier or an encoded value based on the data identifier, (ii) the state identifier (iii) a resource identifier, (iv) and data lifecycle type; and a transmitting device configured to transmit the state meta data to a blockchain network and target device from a source device, and a receiving device configured to receive state meta data from a blockchain network to a target device in support of the system of blockchain-based state of data management.

In several embodiments of the present invention, when data is read, the state at which the data exists may be different from one application or system to another. Data read in one application may be first decoded from an encrypted data sent from another application. The format of the data that is read may also be different as applications and systems may not read data the same way when data is stored, transformed and transmitted. In common applications and systems that read data in a persistent state, such that one application or system reads data the same way as another application or system, consistency in the structure, format and attributes of data should exist. Thus, there is a need for data to be read consistently among common applications and systems. There is a further need for the structure, format and attributes of data to be read consistently across common applications and systems.

In several embodiments of the present invention, when data is updated, the state of that data is changed and any subsequent updates to data further changes the state of data. There are known techniques to record the state of data—e.g., in a log file or database, where the attributes of data are modified at each state change. While the current methods to record the state of data is novel, there is a possibility that these methods may pose high security risks if an application or system is infiltrated—e.g., attacks by a malicious virus or bot. Since logs and databases represent a single point of entry, there exists a vulnerability in a centralized system for storage of states of data. For data to maintain its authenticity and validate integrity at each state change, there needs to exist a decentralized system that manages and authenticates the state of data in applications and systems.

In several embodiments, when data is transferred, the data is said to exist in a data transfer lifecycle at which the state of data exists before, during and after data is transferred. A data transfer lifecycle represents the data before, during and after the data is transferred. Although data may exist in its raw form, data can be manipulated in a data transfer lifecycle, however, which would exhibit several disadvantages to the integrity of data as it exists in applications and systems. As data is transferred across applications and systems in a network, any malicious attack that occurs would yield possible inconsistencies of which could further be exploited as data is transmitted to other applications and systems (e.g. a malicious program could modify packets of data on a transport layer as data travels from one device to another). Modern cyber-attacks e.g., from viruses and malicious bots, are known to intercept data during a data transfer lifecycle. When an attack takes place, data can be removed or modified, making transmission of data unreliable and further challenges the authenticity of data. When an application or system transfers data, there are known methods for securing the data by using standard encryption protocols where a public and private key is used to confirm that data has been securely transferred.

In several embodiments, the present invention is a system for facilitating a blockchain-based state of data management, comprising: a receiving device configured to receive state meta data, wherein the state meta data includes at least a data identifier associated with a blockchain network, a resource identifier, and one of: a public key and a state identifier, a processing device configured to generate a state identifier using a least the public key included in the received state of data, and one or more hashing algorithms if the receiving state of data does not include a state identifier generating a state meta data, wherein the state meta data is formatted based on one or more standards and includes a plurality of data elements, including at least a first data element configured to store properties of the data and a second data element reserved for private use, and the first data element includes at least (i) the type of data, (ii) the length of data, (iii) the origin of data, (iv) the date and time; the second data element includes at least (i) the data identifier or an encoded value based on the data identifier, (ii) the state identifier, (iii) a resource identifier, (iv) and data lifecycle type; and a transmitting device configured to transmit the state meta data to a blockchain network and target device from a source device, and a receiving device configured to receive state meta data from a blockchain network to a target device in supporting the system of blockchain-based state of data management.

In several embodiments, the present invention is a method for facilitating a blockchain-based state of data management, comprising the steps of: receiving, by a receiving device, the state of data, wherein said state of data includes at least a data identifier associated with a blockchain network, a resource identifier, and one of: a public key and a state identifier; generating, by a processing device, a state identifier using at least said public key included in said received state of data and one or more hashing and/or encoding algorithms if the received state of data does not include a state identifier; generating, by said processing device, a state meta data, wherein said meta data includes a first data element configured to store properties of the data and a second data element reserved for private use, and said first data element includes at least (i) the type of data, (ii) the length of data, (iii) the origin of data, (iv) the date and time; said second data element includes at least (i) the data identifier or an encoded value based on the data identifier, (ii) the state identifier (iii) a resource identifier, (iv) and data lifecycle type; transmitting said state meta data to a blockchain network and target device from a source device by way of blockchain-based state of data management.

In several embodiments, the present invention is a system for facilitating a blockchain-based state of data management, comprising: a receiving device configured to receive state meta data, wherein said state meta data includes at least a data identifier associated with a blockchain network, a resource identifier, and one of: a public key and a state identifier, a reference identifier contained in said response code, if indicative of an approved state of data with the generated state meta data. In several embodiments, said reference identifier is at least one of: a value associated with a state meta data using said associated blockchain network and a state identifier generated based on at least a portion of the data included in the second data element included in the generated state meta data. In several embodiments, there is a resource identifier indicative of an authorization resource from said state meta data. In several embodiments, there is an encoded value based on the state identifier containing a hexadecimal value generated using at least the data identifier and one or more algorithms, a state meta data indicator of said state of data, a third data element configured to store a meta code indicative of said state meta data, and a data lifecycle type indicative of a creation or transfer data lifecycle.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
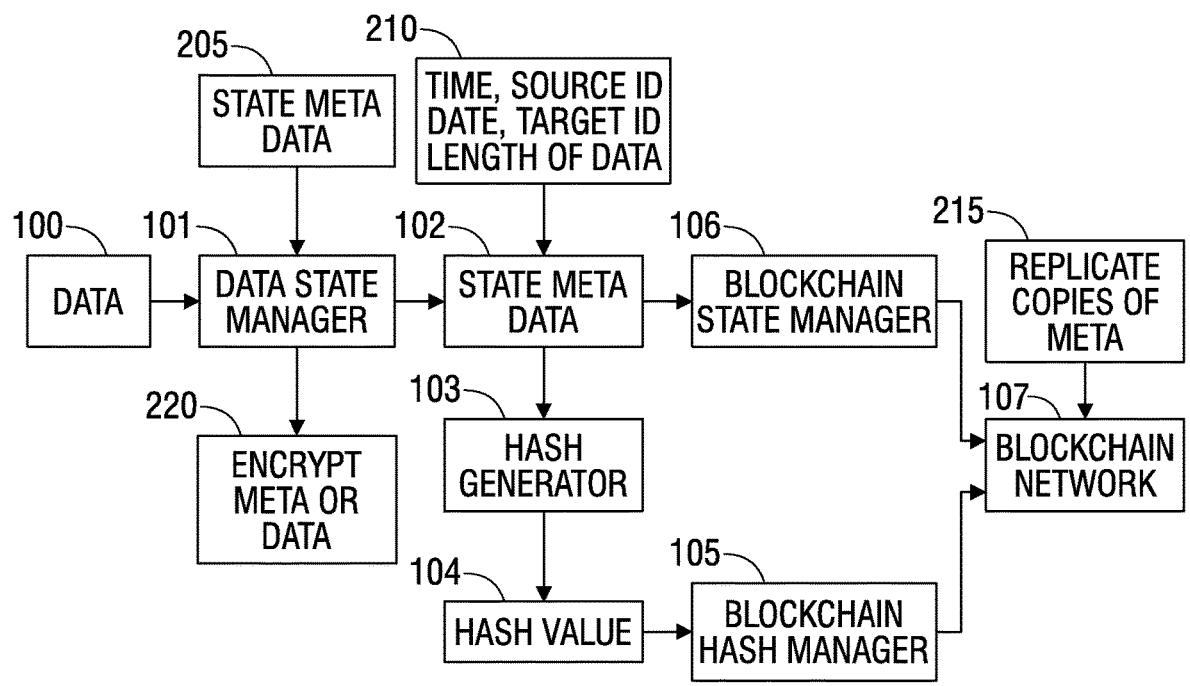
FIG. 1 is a schematic representation of a system of one embodiment of the present application.

One or more illustrative embodiments incorporating the invention disclosed herein are presented below. Applicant has created a revolutionary and novel system and method for blockchain-based state of data management where the state of data is managed by one or more data managers that use blockchain technology to store and authenticate the state of data when data is created, modified and/or transported.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale and arrangements of specific units in the drawings can vary.

Several embodiments of systems and methods for blockchain-based state of data management are described below. In these descriptions, numerous specific details, such as components and system configurations, may be set forth in order to provide a more thorough understanding of the present invention. It will be appreciated, however, by one skilled in the art, that the invention may be practiced without such specific details. Additionally, some well-known blockchain specific concepts, practices, and the like have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may, and not every embodiment necessarily does, include the particular features, structures, or characteristics. Further, some embodiments may have some, all, or none of the features described for other embodiments.

As used in the specification and claims, unless otherwise specified, the use of the ordinal adjectives "first," "second," "third," "fourth," etc. to describe an element merely indicates that a particular instance of an element or different instances of like elements are being referred to, and is not intended to imply that the elements so described must be in a particular sequence, either temporally, spatially, in ranking, or in any other manner.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, New Edition, 2016. Definitions and/or interpretations should not be incorporated from other patent applications, patents, or publications, related or not, unless specifically stated in this specification or if the incorporation is necessary for maintaining validity. Specifically, defined terms: As utilized herein, the following terms are defined:

"Data"—is a set of values of qualitative or quantitative variables representing individual pieces of information (e.g., sales data, revenue, profits, stock price), governments (e.g., crime rates, unemployment rates, literacy rates) and non-governmental organizations (e.g., censuses of the number of homeless people by non-profit organizations).

"Metadata"—is data [information] that provides information about other data. Three distinct types of metadata exist: descriptive metadata, structural metadata, and administrative metadata.

"Descriptive metadata"—describes a resource for purposes such as discovery and identification. It can include elements such as title, abstract, author, and keywords.

"Structural metadata"—is metadata about containers of data and indicates how compound objects are put together, for example, how pages are ordered to form chapters. It describes the types, versions, relationships and other characteristics of digital materials.

"Administrative metadata"—provides information to help manage a resource, such as when and how it was created, file type and other technical information, and who can access it.

"Data identifier"—is a name that identifies (that is, labels the identity of) either a unique object or a unique class of objects, where the "object" or class may be an idea, physical [countable] object (or class thereof), or physical [noncountable] substance (or class thereof) and may be a word, number, letter, symbol, or any combination of those. In metadata, an identifier is a language-independent label, sign or token that uniquely identifies an object within an identification scheme. The suffix identifier is also used as a representation term when naming a data element. Data identifiers (IDs) are lexical tokens that name entities. Data identifiers are used extensively in virtually all information processing systems. Identifying entities makes it possible to refer to them, which is essential for any kind of symbolic processing. Some examples of a data identifier include:

Security Identifier (commonly abbreviated SID) is a unique, immutable identifier of a user, user group, or other security principal. A security principal has a single SID for life (in a given domain), and all properties of the principal, including its name, are associated with the SID.

User identifier as referred to in Unix-like operating systems identify a user within the kernel by a value called a user identifier, often abbreviated to user ID or UID. The UID, along with the group identifier (GID) and other access control criteria, is used to determine which system resources a user can access.

Fragment Identifier in computer hypertext, is a short string of characters that refers to a resource that is subordinate to another, primary resource. The primary resource is identified by a Uniform Resource Identifier (URI), and the fragment identifier points to the subordinate resource.

Object Identifier (OID) in computing, is an identifier mechanism standardized by the International Telecommunications Union (ITU) and ISO/IEC for naming any object, concept, or "thing" with a globally unambiguous persistent name.

Process Identifier (PID) in computing, is a number used by most operating system kernels—such as those of UNIX to uniquely identify an active process. This number may be used as a parameter in various function calls, allowing processes to be manipulated, such as adjusting the process's priority or terminating it altogether.

"Application Layer"—is an abstraction layer that specifies the shared communications protocols and interface methods used by hosts in a communications network. The application layer abstraction is used in both of the standard models of computer networking: the Internet Protocol Suite (TCP/IP) and the OSI model although the TCP/IP application layer does not describe specific rules or data formats that applications must consider when communicating, the original specification does rely on and recommend the robustness principle for application design. Some application layer protocols include FTP, SMTP, DNS, SNMP, SSH, TLS and SSL.

"Presentation Layer"—in computer networking services as the data translator for the network and is responsible for the delivery and formatting of information to the application layer for further processing or display. It relieves the application layer of concern regarding syntactical differences in data representation within the end-user systems. An example of a presentation service would be the conversion of an EBCDIC-coded text computer file to an ASCII-coded file. Some examples of presentation layer protocols include FTAM, VT, JTM, RDA, DTP and AFP.

"Session Layer"—provides the mechanism for opening, closing and managing a session between end-user application processes, i.e., a semi-permanent dialogue. Communication sessions consist of requests and responses that occur between applications. Session-layer services are commonly used in application environments that make use of remote procedure calls (RPCs). The session layer of the Open Systems Interconnection model (OSI model) is responsible for session checkpointing and recovery. It allows information of different streams, perhaps originating from different sources, to be properly combined or synchronized. Some session layer protocols include SCP, SOCKS, SMPP, RPC and PAP.

"Transport Layer"—in computer networking, a conceptual division of methods in the layered architecture of protocols in the network stack in the Internet Protocol Suite and the OSI model. The protocols of the transport layer provide host-to-host communication services for applications. It provides services such as connection-oriented communication, reliability, flow control, and multiplexing. The best-known transport protocol of TCP/IP is the Transmission Control Protocol (TCP), and it lent its name to the title of the entire suite. Some transport layer protocols include TCP, UDP, DCCP and SCTP.

"Network Layer"—in computer networking, is responsible for packet forwarding including routing through intermediate routers and provides the means of transferring variable-length network packets from a source to a destination host via one or more networks. Within the service layering semantics of the OSI network architecture, the network layer responds to service requests from the transport layer and issues service requests to the data link layer. Some common network layer protocols include IPv4, IPv6, ICMP, DDP, EGP and IPX.

"Resource Layer Identifier"—(RLI) is a unique, immutable identifier of a layer derived from the Open Systems Interconnection model (OSI model) and is primarily used to identify the layer by which data is derived during transport. A resource layer identifier contains the name of the layer (e.g., the Application Layer or Session Layer), the protocol (e.g., TCP or SSL) and other metadata relate to the resource layer.

"Source Device Identifier"—(SDI) is a unique, immutable identifier of an application or system from which data originated and is used to identify the source of data. A source device identifier may be a string of characters representing the original application or system and may include details such as device id, name, cluster id (if a source device is part of a cluster of devices) along with user or machine defined classifications of the device (e.g. region id, operating system). A source device identifier may also contain numerical labels which are used to identify the computer network from which the device originates such as an Internet Protocol (IP) address or Media Access Control (MAC) address.

"Target Device Identifier"—(TDI) is a unique, immutable identifier of an application or system from which data should be received and is used to identify the target device from which data will transport to. A target device identifier may be a string of characters representing the original application or system and may include details such as device id, name, cluster id (if a source device is part of a cluster of device) along with user or machine defined classifications of the device (e.g. region id, operating system). A target device identifier may also contain numerical labels which are used to identify the computer network from which the device originates such as an Internet Protocol (IP) address or Media Access Control (MAC) address.

"Public key cryptography" or "asymmetrical cryptography"—is any cryptographic system that uses pairs of keys: public keys which may be disseminated widely, and private keys which are known only to the owner. This accomplishes two functions: authentication, where the public key verifies a holder of the paired private key sent the message, and encryption, where only the paired private key holder can decrypt the message encrypted with the public key.

"Cryptographic Protocol" or "Secured Connection" is security protocol (cryptographic protocol or encryption protocol) is an abstract or concrete protocol that performs a security-related function and applies cryptographic methods, often as sequences of cryptographic primitives. A protocol describes how the algorithms should be used. A sufficiently detailed protocol includes details about data structures and representations, at which point it can be used to implement multiple, interoperable versions of a program.

"Unsecured Connection"—a connection type that represents a connection that does not use cryptographic protocol in an abstraction layer (e.g. HTTP).

"Data management"—comprises all the disciplines related to managing data as a valuable resource which involves the execution and supervision of plans, policies, programs and practices that control, protect, deliver and enhance the value of data and information assets.

"State (computer science)"—is information technology and computer science in a program as described as stateful if it is designed to remember preceding events or user interactions; the remembered information is called the state of the system. Similarly, a computer program stores data in variables, which represent storage locations in the computer's memory. The contents of these memory locations, at any given point in the program's execution, is called the program's state. There are three types of state:

"Compatible states"—are states in a state machine that do not conflict for any input values. Thus, for every input, both states must have the same output, and both states must have the same successor (or unspecified successors), or both must not change. Compatible states are redundant, if occurring in the same state machine.

"Distinguishable states"—are states in a state machine that have at least one input sequence causing different output sequences—no matter which state is the initial state.

"Equivalent states"—are states in a state machine which, for every possible input sequence, the same output sequence will be produced—no matter which state is the initial state.

"Computer Network or data network"—is a digital telecommunications network which allows nodes to share resources. In computer networks, computing devices exchange data with each other using connections between nodes (data links). These data links are established over cable media such as wires or optic cables, or wireless media such as Wi-Fi.

"Blockchain" originally "block chain"—is a continuously growing list of records, called blocks, which are linked and secured using cryptography. Each block typically contains a cryptographic hash of the previous block, a timestamp and transaction data. By design, a blockchain is inherently resistant to modification of the data. It is an open, distributed ledger that can record transactions between two parties efficiently and in a verifiable and permanent way.

"System"—is a regularly interacting or interdependent group of items forming a unified whole. Every system is delineated by its spatial and temporal boundaries, surrounded and influenced by its environment, described by its structure and purpose and expressed in its functioning.

"Information System"—(IS) is an organized system for the collection, organization, storage and communication of information. More specifically, it is the study of complementary networks that people and organizations use to collect, filter, process, create and distribute data and can be a group of components that interact to produce information. Information System is composed of people and computers that processes or interprets information and may contain specific references to information and the complementary networks of hardware and software that people and organizations use to collect, filter, process, create and also distribute data.

"Application"—program (app or application for short) is a computer program designed to perform a group of coordinated functions, tasks, or activities for the benefit of the user. Examples of an application include a word processor, a spreadsheet, an accounting application, a web browser, a media player, an aeronautical flight simulator, a console game or a photo editor. The collective noun application software refers to all applications collectively. This contrasts with system software, which is mainly involved with running the computer. Depending on the activity for which it was designed, an application can manipulate text, numbers, graphics, or a combination of these elements. Some application packages focus on a single task, such as word processing; others, called integrated software include several applications. Some examples of an application include:

a. A web service endpoint that presents three web services: UserCreate, UserSearch, and UserDetailGet.

b. A service-oriented business application (SOBA) that presents a user interface for creating users, and that turns around and calls the UserCreate service. (note that the service itself is a different application).

c. A mobile application that is published to an enterprise application store and thus deployed to employee-owned or operated portable devices enabling authenticated access to data and services.

d. A legacy system composed of a rich client, a server-based middle tier, and a database, all of which are tightly coupled. (e.g. changes in one are very likely to trigger changes in another).

e. A website publishing system that pulls data from a database and publishes it to an HTML format as a sub-site on a public URL.

f. A database that presents data to a spreadsheet application that queries the information for layout and calculations. This is interesting in that the database itself is an application unless the database is already included in another application (like a legacy system).

g. An Excel spreadsheet that contains a coherent set of reusable macros that deliver business value. The spreadsheet itself constitutes a deployment container for the application (like a TAR or CAB file).

h. A set of server-side scripts which generate web pages that work in conjunction with one another to deliver the experience and logic of a web application. It is entirely possible that a sub-site would qualify as a separate application under this definition if the coupling is loose.

i. A web service end point that no one uses, but which can be rationally understood to represent one or more useful steps in a business process.

j. A composite SOA application composed of a set of reusable services and a user interface that leverages those services. There are at least two applications here (the user interface and one or more service components). Each service is not counted as an application.

k. A legacy client-server app that writes to a database to store data and an Excel spreadsheet that uses macros to read data from the database to present a report. There are TWO apps in this example. The database clearly belongs to the legacy app because it was developed with it, delivered with it, and is tightly coupled to it. This is true even if the legacy system uses the same stored procedures as the Excel spreadsheet.

"Hash function"—a hash function is any function that can be used to map data of arbitrary size to data of fixed size. The values returned by a hash function are called hash values, hash codes, digests, or simply hashes (singular value is called a hash, hash code, hash value, or hash key).

"Hash Value"—a value generated from a hash function which that can be used to map data of arbitrary size to data of fixed size. The values returned by a hash function are called hash values, hash codes, digests, or simply hashes (singular value is called a hash, hash code, hash value, or hash key).

"Hash Map"—a value generated from two or more hash values that may or may not be related or connected.

"Hash Generator"—is a system that performs the execution of a hash function on data (e.g., metadata) and produces a hash code.

"State Metadata" or "State Meta"—is descriptive, structural and/or administrative information about metadata from the state of data.

"Change State Meta"—is descriptive, structural and/or administrative information about metadata from the state of data that has been altered and may contain a source device identifier (SDI).

"Transfer State Meta" or "Transport State Meta"—is descriptive, structural and/or administrative information about metadata from the state of data during transport and may contain a resource layer identifier (RLI).

"Receiver State Meta" or "Target State Meta"—is descriptive, structural and/or administrative information about metadata from the state of data received by a target device and may contain a target device identifier (TDI).

"State Data Manager"—or "State Manager"—is a system that performs the execution and supervision of plans, policies, programs and practices that control, protect, deliver and enhance the value of state metadata that is generated from data.

"Data State Change Manager" or "State Change Manager"—is a system that performs the execution and supervision of plans, policies, programs and practices that control, protect, deliver and enhance the value of state metadata that is generated from data that has been altered.

"Blockchain Hash Manager"—system that performs the execution and supervision of plans, policies, programs and practices that control, protect, deliver and enhance the value of cryptographic or encoded values (hash values) using an open distributed ledger (e.g. a blockchain).

"Blockchain State Manager"—system that performs the execution and supervision of plans, policies, programs and practices that control, protect, deliver and enhance the value of state metadata using an open distributed ledger (e.g. a blockchain).

"Blockchain Transport Layer"—a transport layer that may use protocols to provide host-to-host communication services for applications such as connection-oriented communication, reliability, flow control, and multiplexing in a blockchain network.

"Blockchain Network"—a computer network that uses Blockchain technology to maintain a list of records called blocks.

"Blockchain Nodes"—a system which performs blockchain specific actions (e.g. ready blocks) and is represented as being a part off a blockchain network.

"Blockchain Verify"—a system that performs actions of verifying data by accessing a one or more blockchain networks and requesting a response that verifies data.

"Connection Types"—a connection type represents Secured Connections and Unsecured Connections where:
  a. A Secured Connection represents a connection uses encryption and cryptography to secure a protocol in an abstraction layer (e.g., TLS or SSL)
  b. An Unsecured Connection represents a connection that does not use encryption or cryptography on an unsecured protocol in an abstraction layer (e.g. HTTP)

"Blockchain Fragment Distributor"—a system which distributes fragments of data which may include metadata to a receiving system.

"Blockchain Fragment Assembly"—a system which assembles fragments of data and produces a mapping of fragments and a key indicative of the mapping.

"Blockchain Fragment Verifier"—a type of verification system that performs one or more verification actions on an assembly of fragments of data by using a blockchain network.

"Blockchain Response Code"—a numerical value that represents the status of a response from a blockchain network request.

"Verification Service"—A system which verifies data from a state data manager and/or from a blockchain state manager with a given hash value or state metadata.

"Device Application"—a type of software or application that operates on a virtual or physical device.

For convenience and clarity, various components may be described using particular names (e.g., SOFTWARE, CACHE, HASH, MAP, LOCATE, VERIFY), however, embodiments of the invention are not limited to those particular components as defined or used in any particular state management architecture.

Other components and component names (e.g., website, software, application, program, system, server, database) may be used within various embodiments of the present invention.

Certain terms are used in the following description and claims to refer to particular system components. As one skilled in the art will appreciate, different persons may refer to a component by different names. This document does not intend to distinguish between components that differ in name but not function. The drawing figures are not necessarily to scale. Certain features of the invention may be shown exaggerated in scale or in somewhat schematic form, and some details of conventional elements may not be shown, all in the interest of clarity and conciseness.

Although several preferred embodiments of the present invention will be described in detail herein, the invention is not limited hereto. It will be appreciated by those having ordinary skill in the art that various modifications can be made without materially departing from the novel and advantageous teachings of the invention. Accordingly, the embodiments disclosed herein are by way of example and it is to be understood that the scope of the invention is not to be limited by way of example.

A website, application, program, system, server or database, ("SOFTWARE") typically uses caching ("CACHE"), revision control and Version Control Systems ("VCS") to track changes to data over time. VCS is the management of changes to programs, software, and other collections of data where changes are typically identified by a number or letter, termed the "revision". Applications and programs can run revision control internally (e.g., word processors and spreadsheets) whereas version control systems (VCS) may run as stand-alone applications. A CACHE provides a way for data to be stored in memory where future requests for that data can be served faster. A cache client (e.g., a CPU, web browser, operating system, mobile application) uses a CACHE to increase performance and reduce computation time.

When data is cached, the state of the data, referenced by a state identifier, is assumed to have not changed. A SOFTWARE may use the state identifier when writing and reading data from a CACHE. When data has changed in the CACHE such that if the SOFTWARE that reads the data does not have a state identifier for the cached data, or when the state identifier in the CACHE does not match the state identifier used by the SOFTWARE, then the cached data is said to be either outdated or inaccurate. To maintain a valid cache where changes to the data (e.g., changes to the state of that data in memory) persists, the CACHE should employ the proper state identifier. In the event that the data read from a CACHE is inconsistent with what is expected by the SOFTWARE (e.g., when the CACHE or SOFTWARE becomes corrupt or compromised by malware), the state identifier should be used to validate the authenticity of the data. In example, a cache hit occurs when the requested data in a SOFTWARE cannot be found and results in the data being served from the CACHE.

In several embodiments, similar to a distributed ledger in a blockchain network, there exists a method for distributing repositories contained in VCS (e.g. Git, a distributed revision control systems) where source code is copied and maintained in a network. A revision in source code may produce a revision number, which is maintained across a distributed network. Like a revision number in a distributed revision control system, a state identifier in a blockchain-based state management system acts as a strong safeguard against corruption, either accidental or malicious in a SOFTWARE, CACHE, VCS, etc.

In several embodiments, to reduce latency and efficiently transport verifiably accurate data, a blockchain-based state management system and method needs to be implemented where tracking the state of data using a state identifier would ensure the reliability and accuracy of data. The state identifier in a blockchain-based state management system acts as a pointer to the state of data in a cache system and enforces a decentralized method for managing the state of data where accuracy and efficiency is prevalent. For example, in one blockchain-based state management architecture, a first state management process ("HASH") may be used to encode data (which produces a data identifier) and generate state meta data (which produces a state identifier), or a second state management process ("MAP") may be used to transfer the state meta data to all nodes in the blockchain network from the source of origin (which contains a resource identifier). A third state management process ("LOCATE") may be used to retrieve the data identifier from the blockchain network with a given state identifier and a resource identifier. A fourth state management process ("VERIFY") may be used to compare the current data identifier against the data identifier retrieved from the blockchain network. For systems and databases, the state management process may involve millions of iterations as the data transferred and stored in memory changes state at every time interval. There exists the possibility that any of the state identifier, data identifier, resource identifier in parts or whole may be altered or exposed during a data creation lifecycle and data transfer lifecycle. Therefore, embodiments of the present invention provide for encoding and decoding identifiers during a data creation and data transfer lifecycle.

FIG. 1 is one embodiment of a schematic representation illustrating a high-level architecture of the system and method of blockchain-based state of data management 101 which manages the state of data 100. In this embodiment, the data state manager 101 may generate a state metadata 205 from data 100 and may encrypt the metadata and/or data 220. In this embodiment, generating a state metadata 102 may include meta properties 210 (e.g. Time, Date, Source ID, Target ID, Length of Data, etc.). Transmission of the state metadata 102 from a data state manager 101 may include encoding of state metadata 102 into a hash value 104 from a hash generator 103 and linkage thereof to a blockchain hash manager 105 and/or blockchain state manager 106 in the verification and authentication of data using a blockchain network 107 of which then replicates copies 215 of the state metadata 102 and/or hash value 104 in the verification and authentication of the state of data using a blockchain network 107 in accordance with exemplary embodiment.

In several embodiments, when data is read, the state at which the data exists may be different from one application or system to another. Data read in one application may be first decoded from an encrypted data sent from another application. The format in which the data is read may also be different as applications and systems may not read data the same way when data is stored, transformed and transmitted. In some common applications and systems that read data in a persistent state, such that one application or system reads data the same way as another application or system, consistency in the structure, format and attributes of data should exist. Thus, there may be a need for data to be read consistently among common applications and systems. There is a potential further need for the structure, format and attributes of data to be read consistently across common applications and systems.

In some embodiments, the state of data is changed when data is updated and any subsequent updates to data further changes the state of data. There are known techniques to record the state of data—e.g., in a log file or database, where the attributes of data are modified at each state change. While the current methods to record the state of data is novel, there is a possibility that these methods may pose high security risks if an application or system is infiltrated—e.g., attacks by a malicious virus or bot. Since logs and databases represent a single point of entry, there exist a vulnerability in a centralized system for storage states of data. For data to maintain its authenticity and validate integrity at each state change, there needs to exist a decentralized system that manages and authenticates the state of data in applications and systems.

In some embodiments, data is said to exist in a data transfer lifecycle when it is transferred, at which the state of data exists before, during and after data is transferred. A data transfer lifecycle represents the data before, during and after the data is transferred. Although data may exist in its raw form, data can be manipulated in a data transfer lifecycle, however, which would exhibit several disadvantages to the integrity of data as it exists in applications and systems. As data is transferred across applications and systems in a network, any malicious attack that occurs could yield possible inconsistencies which could further be exploited as data is transmitted to other applications and systems. Modern cyber-attacks—e.g., from viruses and malicious bots, are known to intercept data during a data transfer lifecycle. When an attack takes place, data can be removed or modified, making transmission of data unreliable and further challenges the authenticity of data. When an application or system transfers data, there are known methods for securing the data by using standard encryption protocols where a public and private key is used to confirm that data has been securely transferred.

Figure 2:
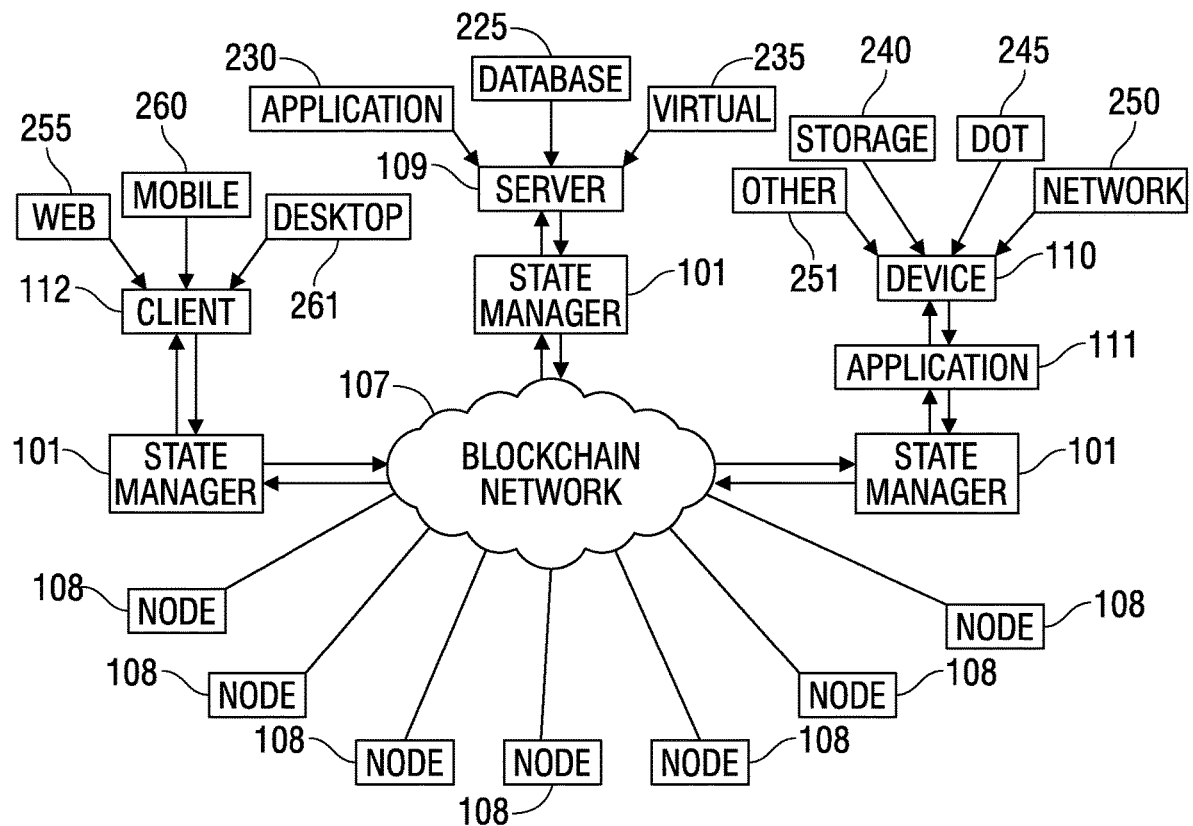
FIG. 2 is a schematic representation of possible components of system of one embodiment of the present application.

FIG. 2 is one embodiment of a schematic representation illustrating some of the source and target devices that may be utilized of the present invention. In one example, a Client 112 may be a source device having an association to a web application 255, mobile application 260 or desktop application 261 with linkage to a data state manager 101 that uses a blockchain network 107 to verify the state of data. In a second example, a server 109 may be a source device having an association to a server application 230, a database 225, or a virtual machine 235 with linkage to a data state manager 101 that uses a blockchain network 107 to verify the state of data. In a third example, a device 110 may contain a device application 111 that may be associated to a storage device 240, dot 245, network 250 or other 251 devices with linkage to a data state manager 101 that uses a blockchain network 107 to verify the state of data. In some embodiments, the blockchain network 107 contain copies of state metadata 102 (FIG. 1) across blockchain nodes 108 in the blockchain network 107 in the verification and authentication of the state of data using a blockchain network 107 in accordance with exemplary embodiment.

Figure 3:
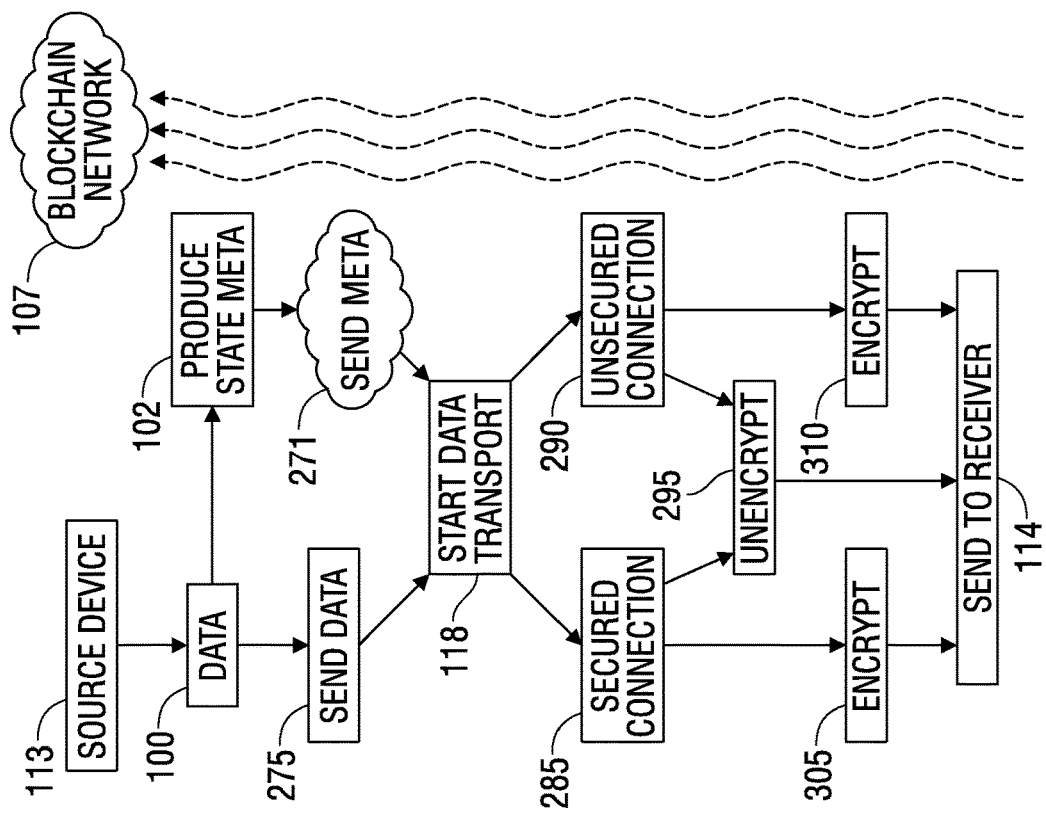
FIG. 3 is an example process flow of a method of one embodiment of the present application.

FIG. 3 is an example system and process flow illustrating a possible method of transmission of data 100 from a source device 113 where the data may be used by a device that sends data 275 or a device that produces state metadata 102 from the data 100 in one embodiment of the present invention. In some embodiments, the device that produced state metadata 102 from data 100 may send meta 271 to a device to start a data transport 118 (e.g. using a transport layer protocol to transport data such as TCP or UDP) where the connection of the transport may be a secured connection 285 (e.g. using an SCTP protocol to cryptographically secure the connection) or an unsecured connection 290 (e.g. using an HTTP protocol). Data transport 118 on both a secured connection 285 and an unsecured connection may be unencrypted 295 prior to the action to send to receiver 114. Data transport on a secured connection 285 may be encrypted 305 prior to the action to send to receiver 114. Data transport on an unsecured connection 290 may be encrypted 310 prior to the action to send to receiver 114 in the verification and authentication of the state of data using a blockchain network 107 in accordance with exemplary embodiment.

Figure 4:
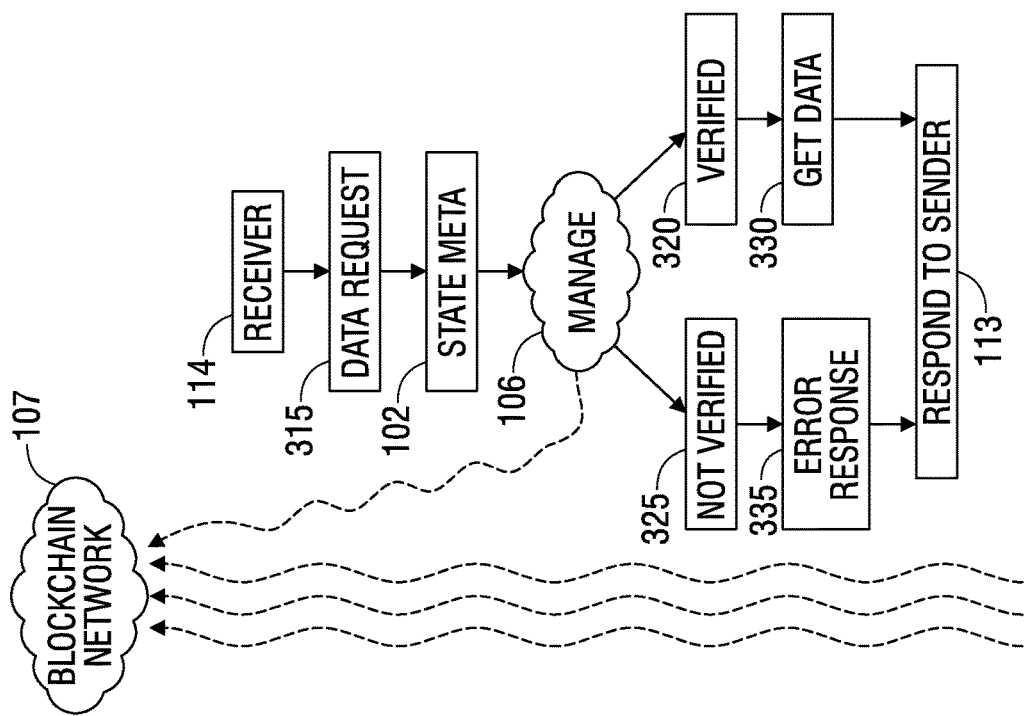
FIG. 4 is an example system and process flow of a method of one embodiment of the present application.

FIG. 4 is an example system and process flow illustrating a system and method of requesting data in a receiver 114 (e.g. a target device) requesting data 315 (e.g. a request to get most recent data) using a state metadata 102 that is sent to a blockchain state manager 106 with a not verified 325 or verified 320 status returned in one embodiment of the present invention. A "not verified" 325 status may contain an error response 335 that is sent as a way of responding to the sender 113. A "verified" 320 status may contain a get data 330 response that is sent as a way of responding to the sender 113 where the blockchain state manager 106 uses a blockchain network 107 in the verification and authentication of the state of data using a blockchain network 107 in accordance with exemplary embodiment.

Figure 5:
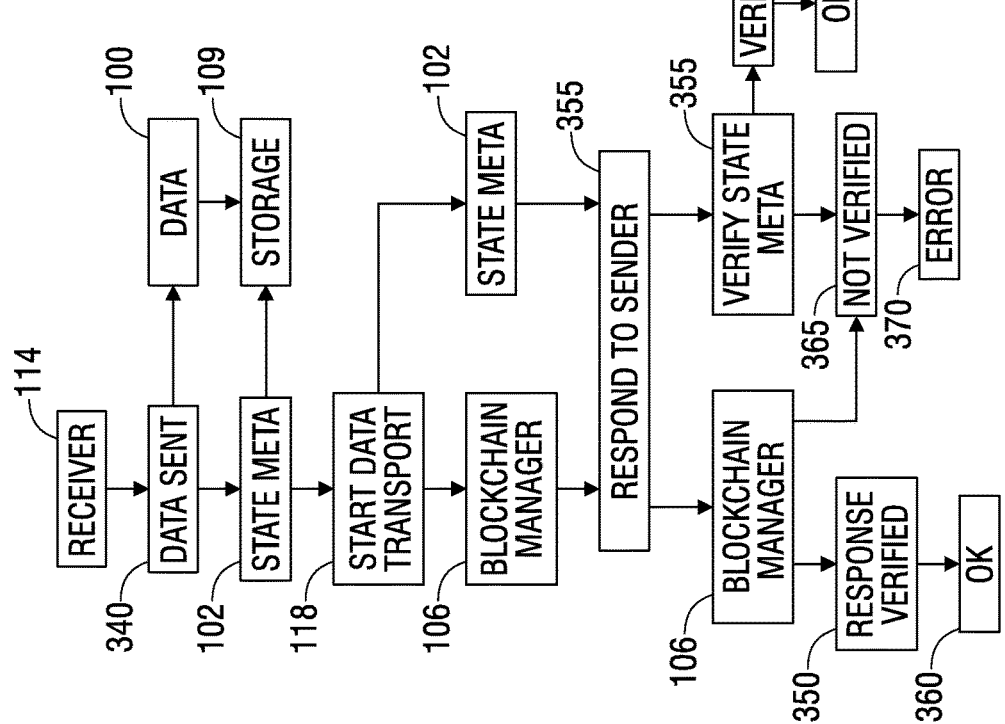
FIG. 5 is an example system and process flow.

FIG. 5 is an example system and process flow illustrating a system and possible method of transmission of data 100 from a receiver 114 (e.g. a target device) where a request for sending data 340 may contain a state metadata 102 and data 100 may be saved to a storage device 109 with possible linkages of state metadata 102 which starts a data transport 118 using a state metadata 102 or a blockchain state manager 106 which would return an action to respond to sender 113 in one embodiment of the present invention. The action to respond to sender 113 may produce a status to verify transport state meta using a blockchain state manager 106 that returns a verified 350 status of "ok" 360 or a "not verified" 365 status or "error" 370. The verify state meta 355 may respond with a status of "not verified" 365 or a response "verified" 375 with a status of "ok" 380 in the verification and authentication of the state of data using a blockchain network 107 in accordance with exemplary embodiment.

Figure 6:
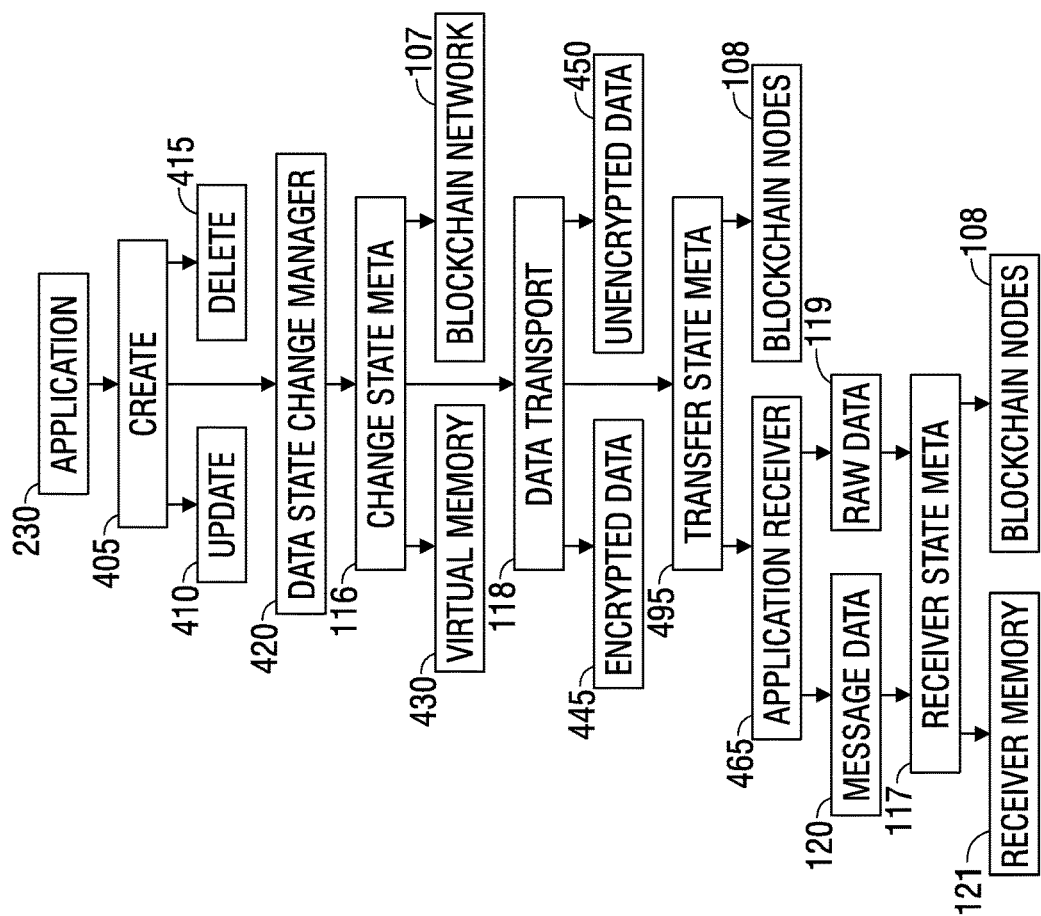
FIG. 6 is an example system and process flow of a method of one embodiment of the present application.

FIG. 6 is an example system and process flow illustrating a possible method of creating 405, updating 410 and/or deleting 415 data by an application 230 which may communicate with a data state change manager 420 that may produce a change state meta 116 in one embodiment of the present invention. The change state meta 116 may be saved in virtual memory 430 and/or nodes 108 in a blockchain network 107. The change state meta 116 may be sent to a data transport 118 device (e.g. a transport layer) where the change state meta 116 may be encrypted 445 or unencrypted 450 prior to a transfer of state meta 445 to an application receiver 465 and/or nodes 108 in a blockchain network 107. The application receiver 465 may combine raw data 119 and message data 120 to generate a receiver state meta 117 which is saved in the receiver memory 121 and/or blockchain nodes 108 in the verification and authentication of the state of data using a blockchain network 107 (FIG. 1) in accordance with exemplary embodiment.

Figure 7:
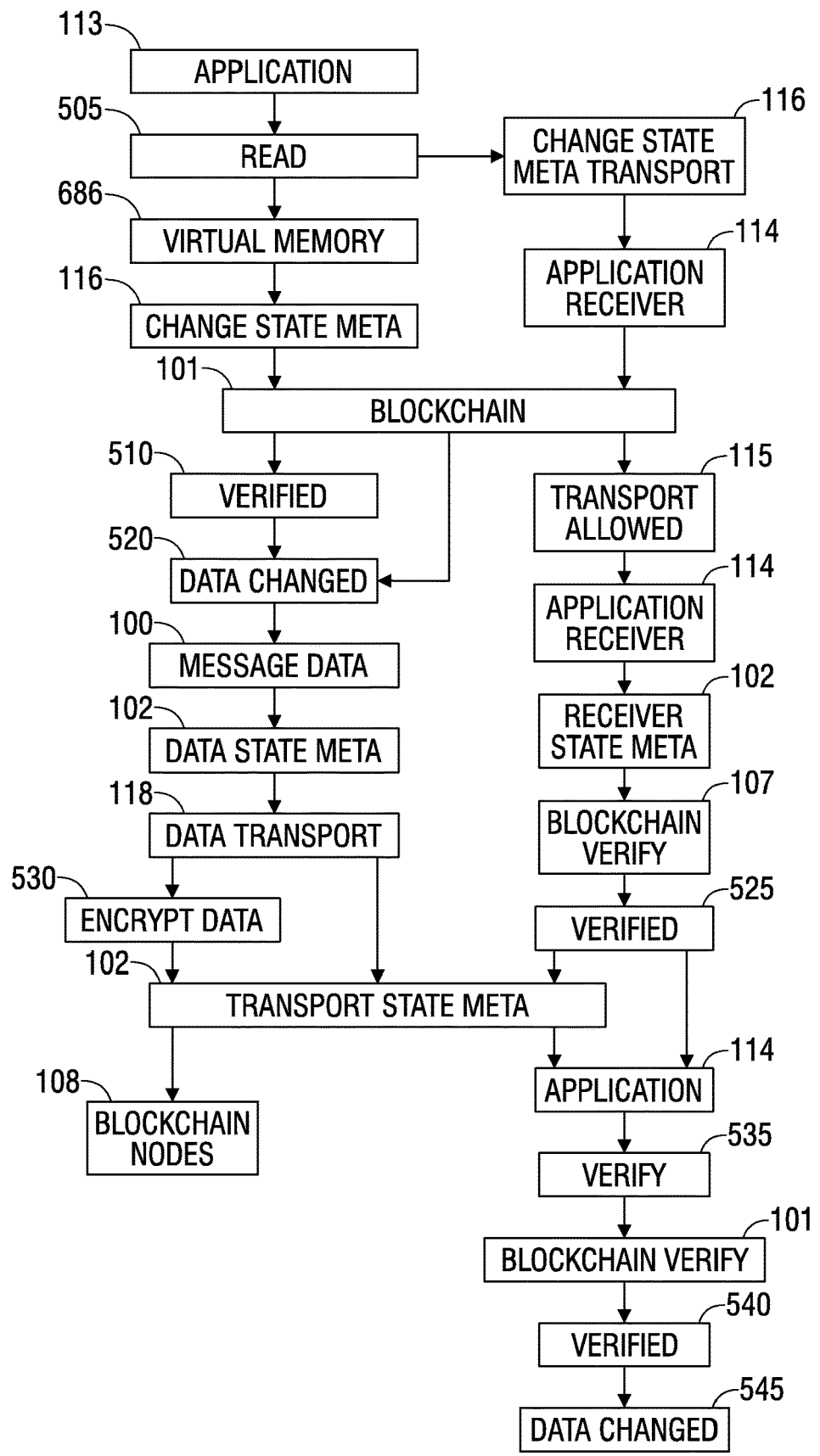
FIG. 7 is an example system and process flow of a method of one embodiment of the present application.

FIG. 7 is an example system and process flow illustrating a system and possible method used from a request to read data 505 from an application 113 that may communicate with a change state meta 116 transport device where an application receiver 114 communicates to a data state manager 101 (e.g. a blockchain state manager or blockchain verification device) in one embodiment of the present invention. The application 113 may retrieve the change state meta 116 from a blockchain verification device 101 of which may return a status of verified 510 or transport allowed 115. A verified 510 status may indicate that data changed 520 and then communicate to a blockchain verification device 101 which may produce a message data 100 and data state metadata 102 prior to a data transport 118 with an encryption of data 530 and/or transport of state metadata 102 to blockchain nodes 108 in a blockchain network 107 (FIG. 3). A status of transport allowed 115 may be sent to an application receiver 114 that produces a receiver state metadata 102 which may be sent to blockchain nodes 108 in a blockchain network 107 (FIG. 3) and may be verified by the data state manager 101 with a verified status 525 which may contain a transport state metadata 102 and/or sent to an application 114. Then the application 114 may request to verify 535 the transport state metadata 102 using a blockchain verification device 101 of which may return a status of verified 540 and a final status of data changed 545 in the verification and authentication of the state of data using a blockchain network 107 (FIG. 3) in accordance with exemplary embodiment.

Figure 8:
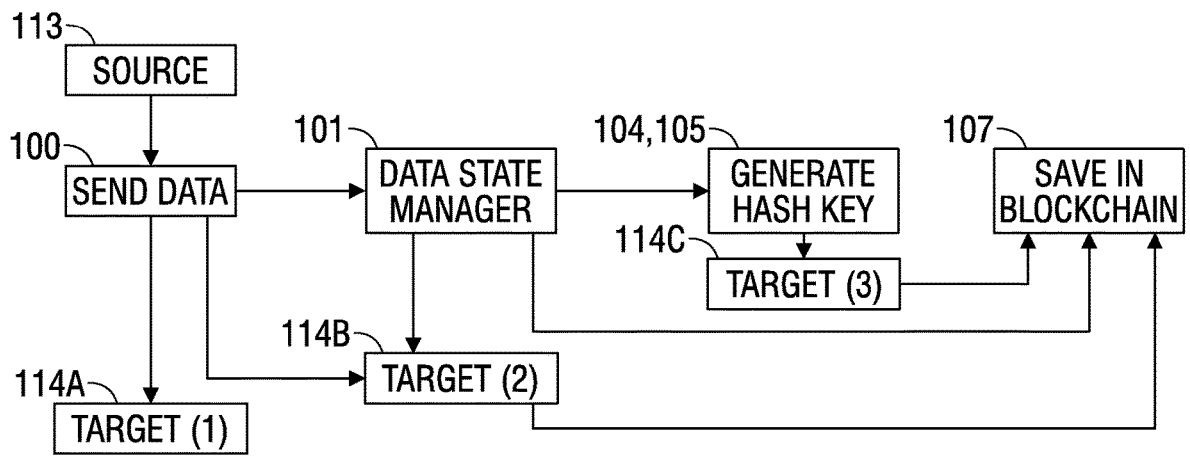
FIG. 8 is an example system and process flow of a method of one embodiment of the present application.

FIG. 8 is an example system and process flow illustrating a system and possible method of transporting data 100 from a source device 113 with linkage to a data state manager 101 that produces a state metadata with linkage to blockchain hash manager 105 to generate a hash value 104 which may be sent to a target device 114C that is saved in a blockchain network 107 in one embodiment of the present invention. The source device 113 may send data 100 to a target device 114A directly or to another target device 114B that may save data in a blockchain network 107 in the verification and authentication of the state of data using a blockchain network 107 in accordance with exemplary embodiment.

Figure 9:
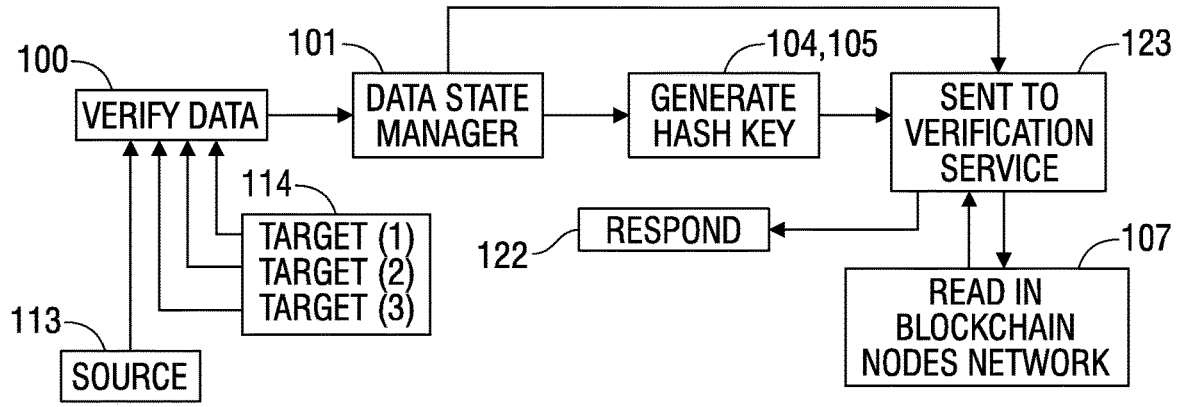
FIG. 9 is an example system and process flow of a method of one embodiment of the present application.

FIG. 9 is an example system and process flow illustrating a system and possible method of requesting data 100 from a source device 113 and/or one or more target devices 114 that communicate to a data state manager 101 which may use a blockchain hash manager 105 to generate a hash value 104 and linkage thereof to a verification service 123 that contain a data state manager 101 in one embodiment of the present invention. The verification service 123 may return a response 122 and may communicate with a blockchain network 107 in the verification and authentication of the state of data using a blockchain network 107 in accordance with exemplary embodiment.

Figure 10:
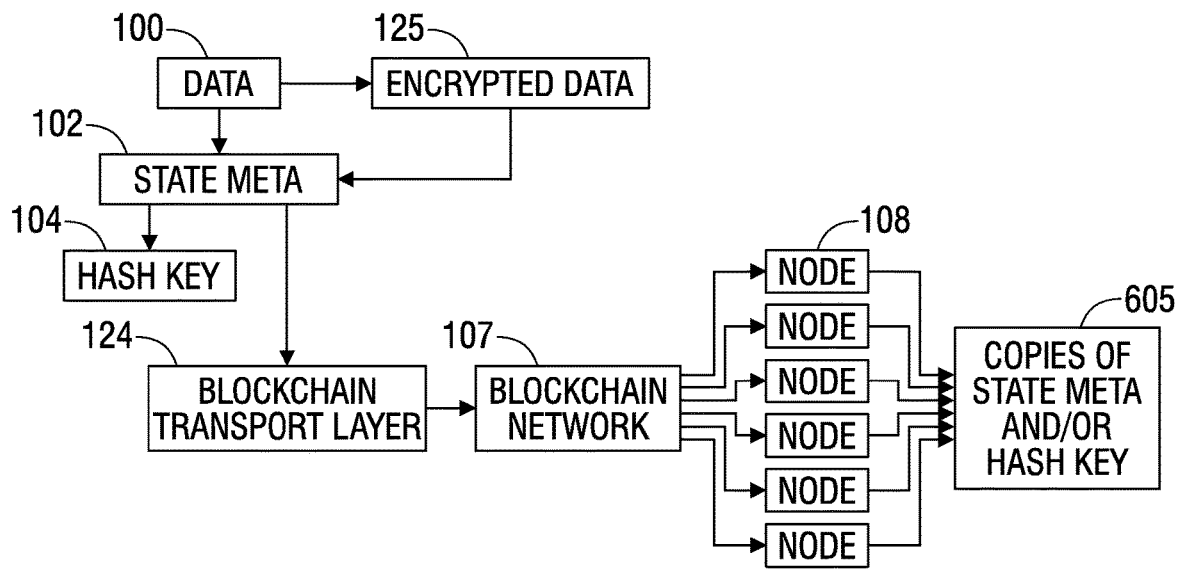
FIG. 10 is an example system and process flow of a method of one embodiment of the present application.

FIG. 10 is an example system and process flow illustrating a system and possible method of transporting a data 100 which may be encrypted 125 and a state metadata 102 which may be encoded into a hash value 104 in one embodiment of the present invention. The state metadata 102 may then be transported to one or more blockchain transport layer 124 with linkage to a blockchain network 107 and the state metadata 102 or the hash value 104 may be saved on blockchain nodes 108 in a blockchain network 107 where copies 605 of state metadata 102 and/or hash value 104 are stored in the verification and authentication of the state of data using a blockchain network 107 in accordance with exemplary embodiment.

Figure 11:
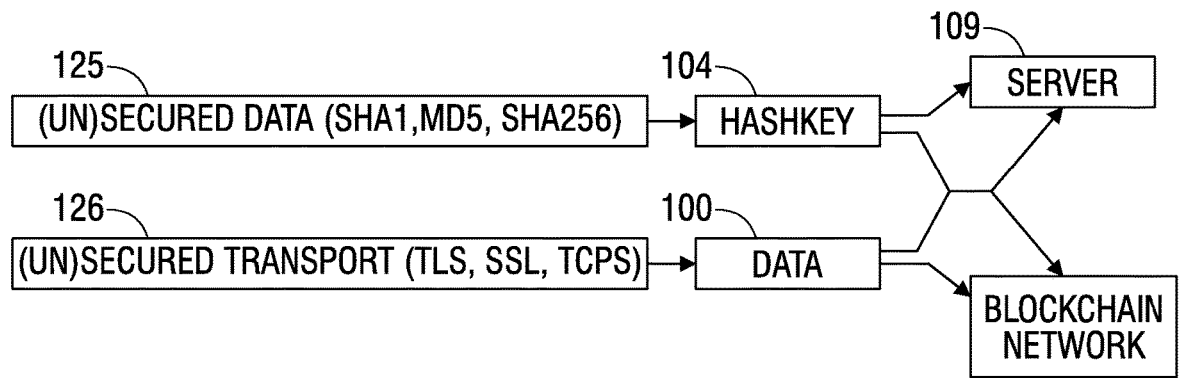
FIG. 11 is an example system and process flow of a method of one embodiment of the present application.

FIG. 11 is an example system and process flow illustrating a system and possible method of transporting data 100 which may be encrypted 125 (e.g. using a data encryption function such as SHA256) into a hash value 104 that may be sent to a server 109 and/or a blockchain network 107 where the transport of data may be secured 126 (e.g. using a cryptographic protocol such as TLS) in the verification and authentication of the state of data using a blockchain network 107 in accordance with exemplary embodiment in one embodiment of the present invention.

Figure 12:
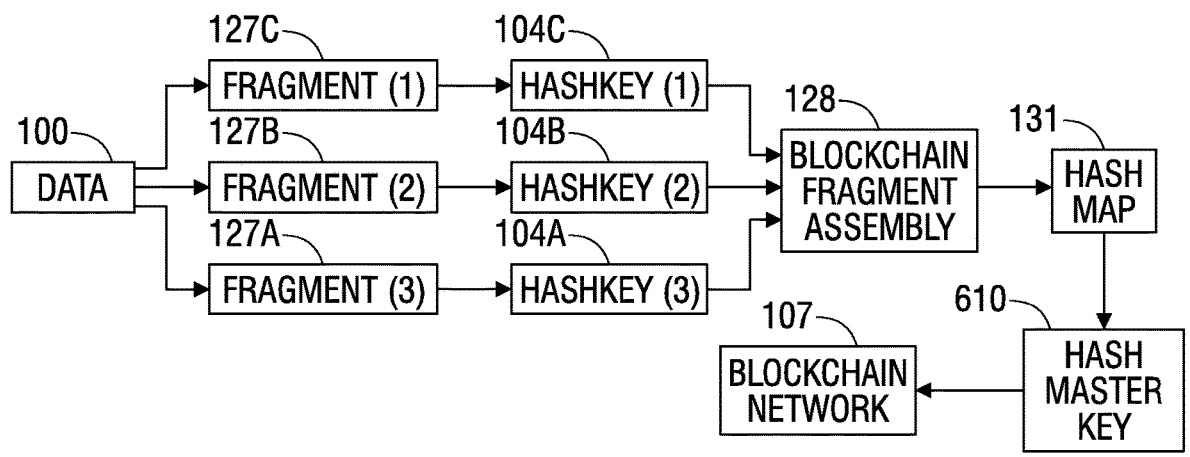
FIG. 12 is an example system and process flow of a method of one embodiment of the present application.

FIG. 12 is an example system and process flow illustrating a system and possible method of fragmenting data 100 into a first fragment 127C with possible encoding into a hash value 104C, a second fragment 127B with possible encoding into a hash value 104B and a third fragment 127A with possible encoding into a hash value 104A and linkage there over to a blockchain fragment assembly 128 that produces a hash map 131 and a hash master key 610 with linkage into a blockchain network 107 in the verification and authentication of the state of data using a blockchain network 107 in accordance with one exemplary embodiment.

Figure 13:
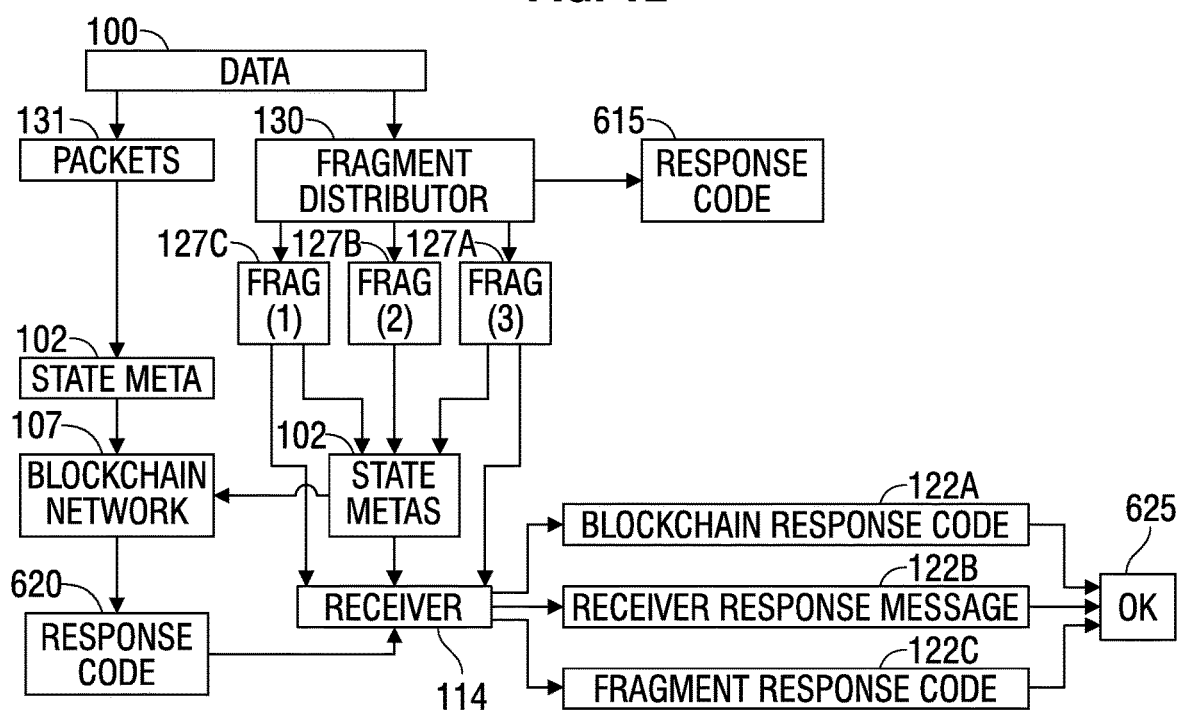
FIG. 13 is an example system and process flow of a method of one embodiment of the present application.

FIG. 13 is an example system and process flow illustrating a system making use of data 100 that is transported into packets 131 that may contain a state metadata 102 with linkage to a blockchain network 107 of which may produce a response code 620 to a receiver 114. The data 100 may also be transported to a blockchain fragment distributor 130 which may produce a response code 615 and/or a first fragment 127C, a second fragment 127B and/or a third fragment 127A and may contain state metas 102 with possible linkages to a receiver 114 and/or a blockchain network 107. The receiver 114 may contain a blockchain response code 122A, a receiver response message 122B and/or a fragment response code 122C with a final status of "ok" 625 in the verification and authentication of the state of data using a blockchain network 107 in accordance with one exemplary embodiment.

Figure 14:
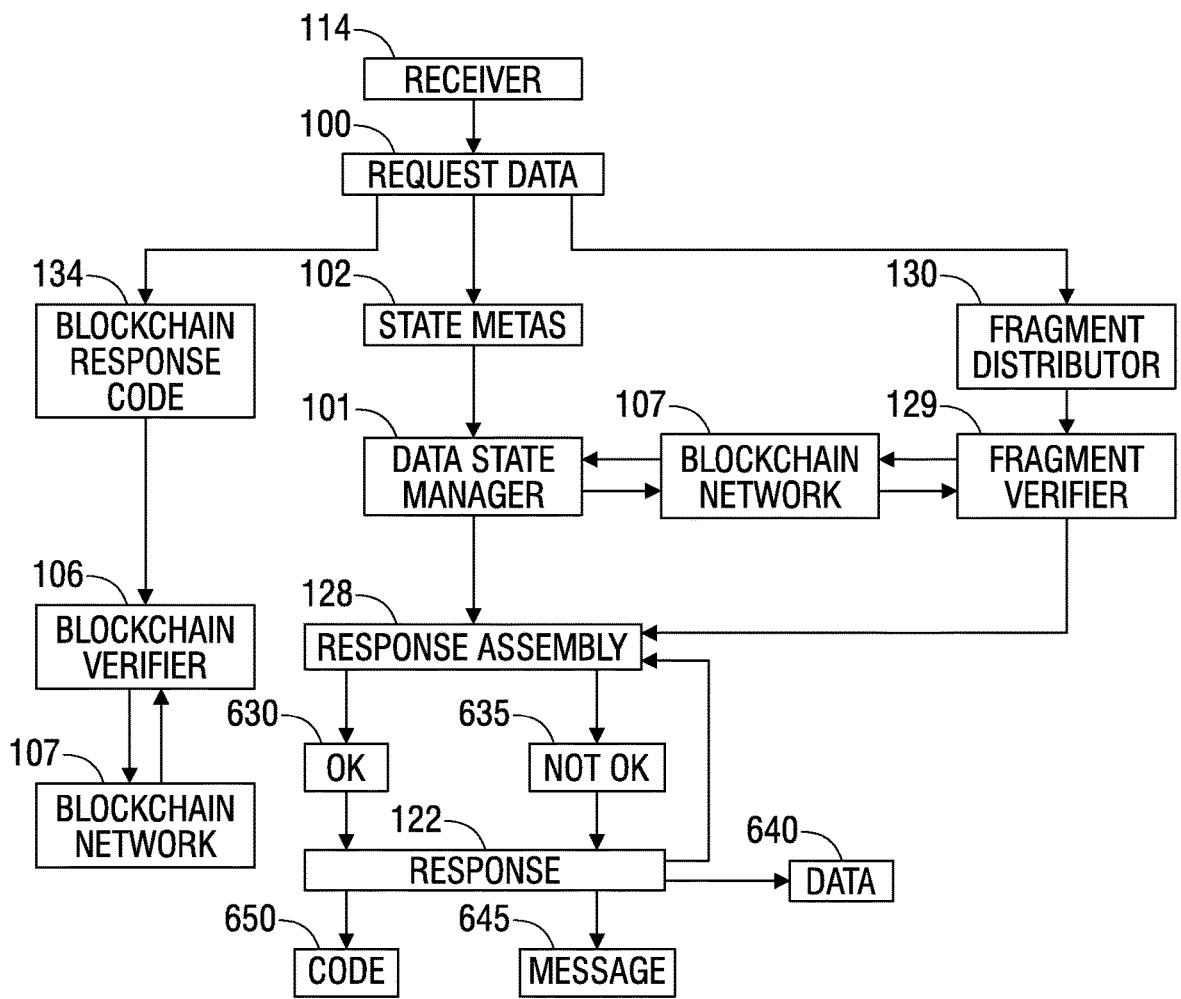
FIG. 14 is an example system and process flow of a method of one embodiment of the present application.

FIG. 14 is an example system and process flow illustrating a system comprising of a request for data 100 from a receiver 114 and linkages to a blockchain fragment distributor 130 that uses a blockchain fragment verifier 129 with linkages to a blockchain network 107. The request for data 100 may include one or more state metadata 102 which may then be verified by a data state manager 101 which may verify state metadata 102 or fragments from a blockchain fragment distributor 130 in one embodiment of the present invention. The request for data 100 may also include a blockchain response code 134 which may use a blockchain state manager 106 that uses a blockchain network 107. Results from the data state manager 101 may be sent to a response fragment assembly 128 which returns a response 122 of "ok" 630 or a response 122 of "not ok" 635. The response 122 may return data 640 and/or may return a status code 650 and a message 645 in the verification and authentication of the state of data using a blockchain network 107 in accordance with one exemplary embodiment.

Figure 15:
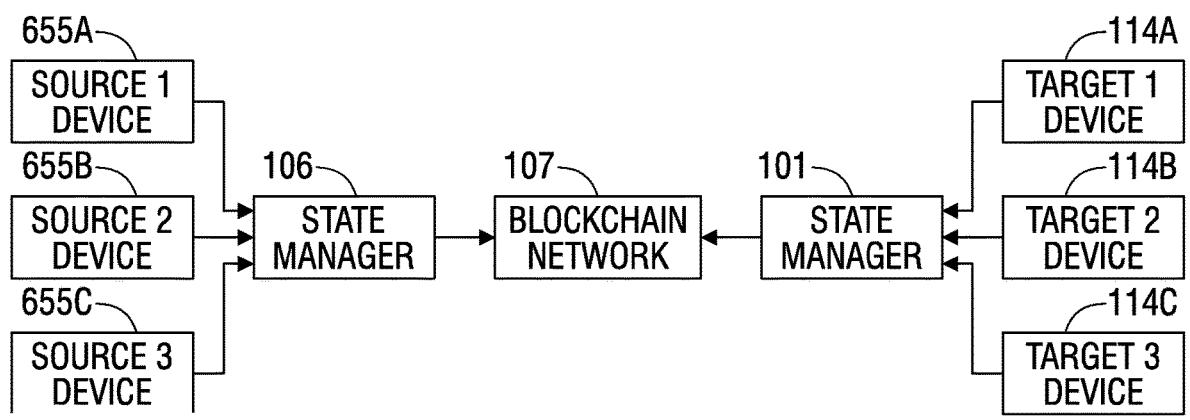
FIG. 15 is an example system and process flow of a method of one embodiment of the present application.

FIG. 15 is an example system and process flow illustrating a system comprising a first source device 655A, a second source device 655B and/or a third source device 655C with linkage to a blockchain state manager 106 that uses a blockchain network 107 and linkage to another blockchain state manager 101 that uses a blockchain network 107 in one embodiment of the present invention. The data state manager 101 may have linkages to a first target device 114A, a second target device 114B and/or a third target device 114C. There may be one or more source devices with linkages to a blockchain state manager 106 and one or more target devices with linkages to a blockchain state manager 101 that communicate to a blockchain network 107 in the verification and authentication of the state of data using a blockchain network 107 in accordance with one exemplary embodiment.

Figure 16:
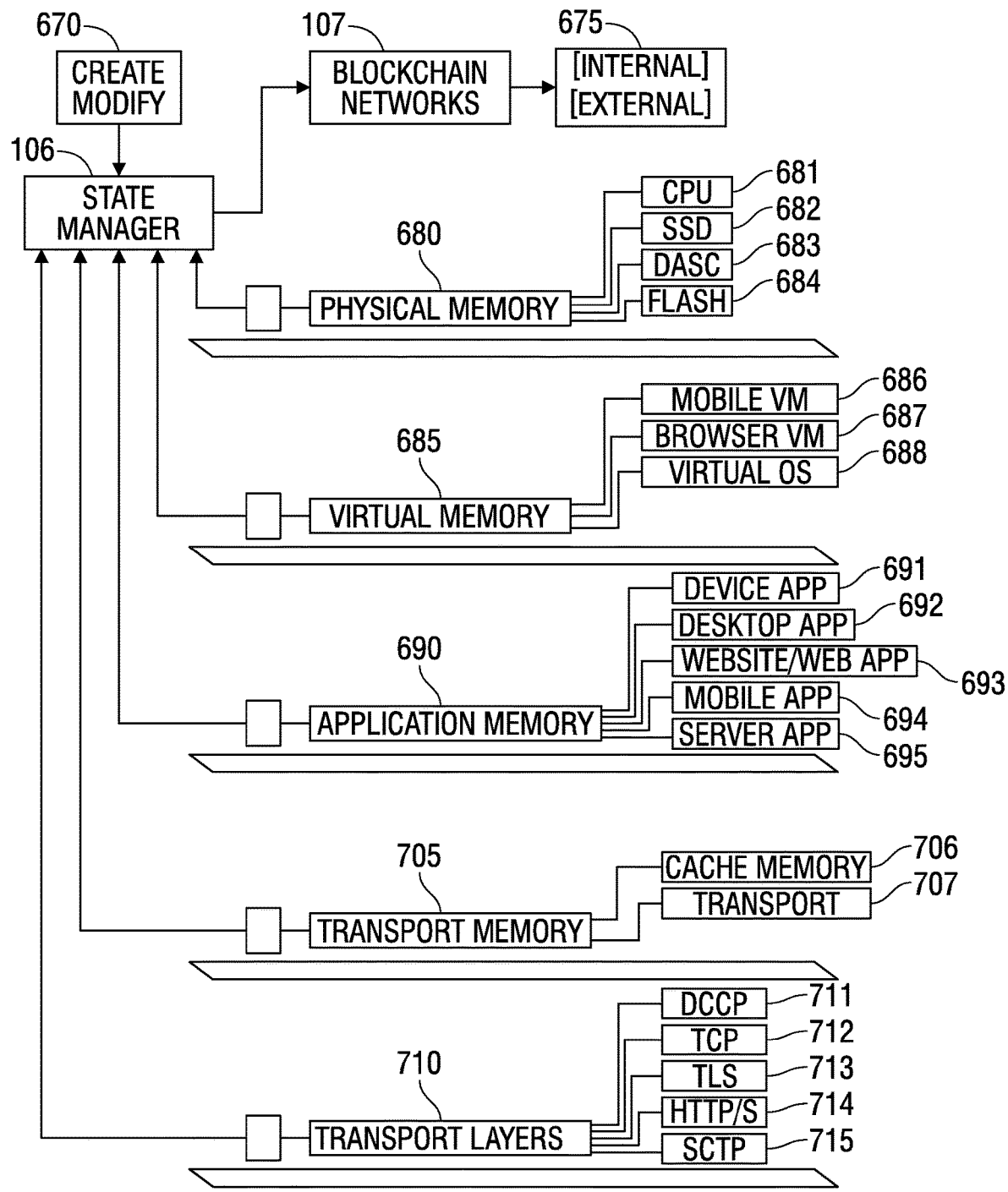
FIG. 16 is an example system and process flow of a method of one embodiment of the present application.

FIG. 16 is an example system and process flow illustrating a system comprising of the use of a blockchain state manager 106 when data is created or modified 670 where the blockchain state manager 106 has linkages to one or more blockchain networks 107 with networks being internal or external 675 from the blockchain state manager 106. An application that uses physical memory 680 such as CPU 681, SSD 682, DASC 683 or FLASH 684 may have linkages to a blockchain state manager 106. An application that uses virtual memory 685 such as a mobile virtual machine 686, a browser virtual machine 687 or a virtual operating system 688 may have linkages to blockchain state manager 106. An application that uses application memory 690 such as a device application 691, a desktop application 692, website or web application 693, mobile application 694 or server application 695 may have linkages to a blockchain state manager 106. An application that uses transport memory 705 such as cache memory 706 and temporary transport data 707 may have linkages to a blockchain state manager 106. Transport layers 710 that contain a transport protocol such as DCCP 711, TCP 712, TLS 713, HTTP/S 714 or SCTP 715 may have linkages to a blockchain state manager 106 in the verification and authentication of the state of data using a blockchain network 107 in accordance with exemplary embodiment.

In several embodiments, the present invention is a method for facilitating a blockchain-based state of data management, comprising the steps of: receiving, by a receiving device, the state of data, wherein said state of data includes at least a data identifier associated with a blockchain network, a resource identifier, and one of: a public key and a state identifier; generating, by a processing device, a state identifier using at least said public key included in said received state of data and one or more hashing and/or encoding algorithms if the received state of data does not include a state identifier; generating, by said processing device, a state meta data, wherein said meta data includes a first data element configured to store properties of the data and a second data element reserved for private use, and said first data element includes at least (i) the type of data, (ii) the length of data (iii) the origin of data, (iv) the date and time; said second data element includes at least (i) the data identifier or an encoded value based on the data identifier, (the state identifier (iii) a resource identifier, (iv) and data lifecycle type; transmitting said state meta data to a blockchain network and target device from a source device by way of blockchain-based state of data management. In several embodiments there are the additional steps of: receiving, by said receiving device, a return state meta data from the blockchain network to said target device, wherein the return state meta data includes a third data element configured to store a response code. In several embodiments there are the additional steps of: transmitting, by said transmitting device, the return state meta data in response to the received response data from said target device to the source device. In several embodiments, if the response code is indicative of an approved state of data with said generated state meta data, said second data element further includes a reference identifier. In several embodiments, said reference identifier is at least one of: a value associated with a state meta data using the associated blockchain network and said state identifier generated based on at least a portion of the data included in said second data element included in the generated state meta data. In several embodiments, said state meta data includes a resource identifier indicative of an authorization resource. In several embodiments, said encoded value based on the state identifier is a hexadecimal value generated using at least the data identifier and one or more algorithms. In several embodiments, said state meta data includes a third data element configured to store meta code indicative of said state meta and data lifecycle type.

In several embodiments, the present invention is a system for facilitating a blockchain-based state of data management, comprising: a receiving device configured to receive state meta data, wherein said state meta data includes at least a data identifier associated with a blockchain network, a resource identifier, and one of: a public key and a state identifier. In several embodiments, the system further comprises a receiving device that receives a return state meta data from the blockchain network to a target device, wherein said return state meta data includes a third data element configured to store a response code. In several embodiments, the system further comprises a transmitting device that transmits said return state meta data in response to said received response data from said target device to said source device. In several embodiments the system further comprises a reference identifier contained in said response code, if indicative of an approved state of data with the generated state meta data. In several embodiments the system further comprises a reference identifier is at least one of: a value associated with a state meta data using said associated blockchain network and a state identifier generated based on at least a portion of the data included in the second data element included in the generated state meta data. In several embodiments, the system further comprises a resource identifier indicative of an authorization resource from said state meta data. In several embodiments, the system further comprises an encoded value based on the state identifier containing a hexadecimal value generated using at least the data identifier and one or more algorithms. In several embodiments, the system further comprises a state meta data indicator of said state of data, a third data element configured to store a meta code indicative of said state meta data, a data lifecycle type indicative of a creation or transfer data lifecycle, a private key value indicative of a security value from the state meta data, a source device identifier indicative of the source device originating the data, a target device identifier indicative of the target device from which a data will be transported to and a resource layer identifier indicative of the layer by which the data is transferred. A system of state of data management using at least one blockchain network including members selected from the group of data consisting of cryptographic, metadata, encoded, multiple layers of the Open Systems Interconnection model and/or combinations therein.

While preferred embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. Accordingly, it is intended that the following claims be interpreted to embrace all such variations and modifications.

While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above embodiments or may be acquired from practicing of the disclosure, without departing from the breadth or scope as a person skilled in the art will recognize.

I claim:

1. A method for facilitating a blockchain-based state of data management, the method comprising:
   receiving, by a processor, the state of data, wherein said state of data includes at least a data identifier associated with a blockchain network, a resource identifier, and one of: a public key and a state identifier;
   on a condition that the state of the data does not include the state identifier, generating, by said processor, the state identifier using at least said public key included in said received state of data received and one or more algorithms, wherein the one or more algorithms include at least one of a hashing algorithm and an encoding algorithm;
   generating, by said processor, a state metadata based on the state identifier; and
   transmitting, by said processor, said state metadata to the blockchain network and a target device;
   wherein:
      said state metadata includes a first data element configured to store properties of the data and a second data element reserved for private use,
      said first data element includes at least one of (i) a type of data, (ii) a length of the data (iii) an origin of the data, and (iv) the date and time, and
      said second data element includes at least (i) an encoded value based on the data identifier, (ii) the state identifier (iii) the resource identifier, (iv) and data lifecycle type, wherein said encoded value is based on the state identifier and a hexadecimal value generated using at least the data identifier and the one or more algorithms.

2. The method of claim 1, further comprising:
   receiving, by said processor, a return state meta data from said target device via the blockchain network, wherein the return state meta data includes a third data element configured to store a response code.

3. The method of claim 2, further comprising:
   transmitting, by said processor, the return state meta data to a source device.

4. The method of claim 3, wherein
   on a condition that the response code is indicative of an approved state of data, said second data element further includes a reference identifier.

5. The method of claim 4, wherein
   said reference identifier is at least one of: a value associated with the state meta data using the blockchain network and said state identifier is generated based on at least a portion of the data included in said second data element included in the state meta data.

6. The method of claim 1, wherein
   said state meta data includes a resource identifier indicative of an authorization resource.

7. The method of claim 1, wherein
said state meta data includes a third data element configured to store meta code indicative of said state meta and data lifecycle type.

8. The method of claim 1, wherein the blockchain network includes multiple layers of the Open Systems Interconnection model.

9. A system for facilitating a blockchain-based state of data management, comprising:
- a communication interface that is communicatively coupled to a blockchain network; and
- a processor communicatively coupled to the communication interface, wherein the processor is configured to:
  receive, using said communication interface, the state of data, wherein said state of data includes at least a data identifier associated with the blockchain network, a resource identifier, and one of: a public key and a state identifier;
  on a condition that the state of the data does not include the state identifier, generate the state identifier using at least said public key included in said state of data received and one or more algorithms, wherein the one or more algorithms include at least one of a hashing algorithm and an encoding algorithm;
  generate, a state metadata based on the state identifier; and
  transmit, using said communication interface, said state metadata to the blockchain network and a target device;
  wherein:
    said state metadata includes a first data element configured to store properties of the data and a second data element reserved for private use,
    said first data element includes at least one of (i) a type of data, (ii) a length of the data (in) an origin of the data, and (iv) the date and time, and
    said second data element includes at least (i) an encoded value based on the data identifier, (ii) the state identifier (iii) the resource identifier, (iv) and data lifecycle type,
    wherein said encoded value is based on the state identifier and a hexadecimal value generated using at least the data identifier and the one or more algorithms.

10. The system of claim 9, wherein the processor is further configured to:
receive, using the communication interface, a return state meta data from the target device via the blockchain network, wherein said return state meta data includes a third data element configured to store a response code.

11. The system of claim 10, wherein the processor is further configured to:
transmit, using the communication interface, said return state meta data to a source device.

12. The system of claim 10, further comprising:
on a condition that the response code is indicative of an approved state of data, said second data element further includes a reference identifier.

13. The system of claim 12, wherein
said reference identifier is at least one of: a value associated with the state meta data using said blockchain network and said state identifier is generated based on at least a portion of the data included in the second data element included in the state meta data.

14. The system of claim 9, wherein:
said state meta data further includes a resource identifier indicative of an authorization resource.

15. The system of claim 9, wherein
said state meta includes a third data element configured to store a meta code indicative of said state meta data.

16. The system of claim 9, wherein the blockchain network includes multiple layers of the Open Systems Interconnection model.

* * * * *